US006958171B2

(12) United States Patent
Flosbach et al.

(10) Patent No.: US 6,958,171 B2
(45) Date of Patent: Oct. 25, 2005

(54) PROCESS FOR REPAIRING COATED SUBSTRATE SURFACES

(75) Inventors: Carmen Flosbach, Wuppertal (DE); Karl-Friedrich Doessel, Wupprtal (DE); Werner Lenhard, Wuppertal (DE); Oliver Reis, Witten (DE); Thomas Fey, Mainz (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 109 days.

(21) Appl. No.: 10/017,132

(22) Filed: Dec. 14, 2001

(65) Prior Publication Data

US 2003/0113444 A1 Jun. 19, 2003

(51) Int. Cl.[7] .......................... B05D 3/02; B32B 35/00

(52) U.S. Cl. .................... 427/140; 427/146; 427/372.2

(58) Field of Search ................................ 427/140, 142, 427/146, 147, 148, 150, 152, 154, 207.1, 427/208, 208.2, 208.4, 208.8, 209, 372.2, 427/384, 388.1, 407.1, 409; 156/60, 71, 94, 156/230, 272.2, 273.7, 275.5, 275.7

(56) References Cited

U.S. PATENT DOCUMENTS

| | | | | |
|---|---|---|---|---|
| 2,681,877 | A * | 6/1954 | Seymour | 156/240 |
| 3,640,791 | A | 2/1972 | Rosenheim | |
| 4,061,516 | A * | 12/1977 | George et al. | 156/94 |
| 4,246,315 | A | 1/1981 | Kopp et al. | |
| 4,497,851 | A * | 2/1985 | de Vroom | 427/147 |
| 4,568,589 | A | 2/1986 | Briggs | |
| 4,661,182 | A | 4/1987 | Lerner | |
| 4,762,674 | A * | 8/1988 | Cheng et al. | 376/405 |
| 5,166,007 | A * | 11/1992 | Smith et al. | 428/63 |
| 5,254,192 | A | 10/1993 | Speakman | |
| 5,387,304 | A * | 2/1995 | Berner et al. | 156/212 |
| 5,891,292 | A * | 4/1999 | Goodman et al. | 156/275.5 |
| 6,221,439 | B1 * | 4/2001 | Negele et al. | 427/514 |
| 6,428,887 | B1 * | 8/2002 | Vargo et al. | 428/343 |
| 6,534,130 | B1 | 3/2003 | Maag et al. | |

FOREIGN PATENT DOCUMENTS

| | | |
|---|---|---|
| DE | 19654918 | 1/1998 |
| EP | 361351 | 4/1990 |
| EP | 251546 | 1/1998 |
| EP | 1 065 297 A2 | 1/2001 |
| EP | 1065297 A | 1/2001 |
| GB | 1588458 A | 4/1981 |
| JP | 07 008 892 A | 1/1995 |
| JP | 07 008892 A | 1/1995 |
| WO | WO 00/08094 | 2/2000 |
| WO | WO 00/63015 | 10/2000 |

OTHER PUBLICATIONS

Definition of "infrared" from Hawley's Condensed Chemical Dictionary, 12th Edition, © 1993 by Van Nostrand Reinhold, p. 635.*

International Search Report for FA1043 PCT.

Copy of the PCT Written Opinion mailed Dec. 10, 2003 for FA-1043 PCT.

* cited by examiner

*Primary Examiner*—Timothy Meeks
*Assistant Examiner*—William Phillip Fletcher, III
(74) *Attorney, Agent, or Firm*—Steven C. Benjamin

(57) ABSTRACT

The invention relates to a process for repairing coated substrate surfaces comprising the following successive steps:

a) optionally, preparing a blemished area to be repaired,
b) providing at least one backing film coated on one side with an uncured or at least only partially cured coating layer of a thermally curable coating composition,
c) applying the at least one backing film with its coated side onto the blemished area to be repaired,
d) supplying thermal energy to the coating applied in this manner onto the blemished area to be repaired and
e) removing the at least one backing film, wherein the supply of thermal energy onto the coating proceeds through the at least one backing film, and/or after removal of the at least one backing film.

8 Claims, No Drawings

PROCESS FOR REPAIRING COATED SUBSTRATE SURFACES

FIELD OF THE INVENTION

This invention relates to a process for repairing coated substrate surfaces by means of coated backing films. The process may find application in vehicle and industrial coating, in particular for repairing small coating blemishes.

DESCRIPTION OF RELATED ART

Thermally curable coating compositions are used in vehicle coating/vehicle repair coating. Coating compositions based on free-radically and/or cationically polymerizable binders or on binders which crosslink by means of a polycondensation and/or polyaddition reaction are for example used in such applications.

When repairing coating blemishes in vehicle repair coating, it is often unnecessary completely to recoat an entire vehicle or vehicle component, for example, a bonnet. In the case of small coating blemishes, it is usually sufficient to recoat the area immediately surrounding the blemished area (spot repair). The preparation, coating and clean-up effort expended by the finisher is here largely independent of the size of the coating blemish to be repaired. For example, operations, such as, preparing the coating material and spray gun, putting on the breathing mask, applying the coating with a spray gun, cleaning the spray gun and other equipment or containers must always be carried out.

There is accordingly a requirement in repair coating for simplified processes for repairing small coating blemishes, in particular, also, in those cases in which only a top coat is to be repaired. This is a requirement not only in a paint shop, but also in repair coating during the original coating of vehicles.

Prior art processes are known in which, as an alternative to conventional spray application, coated films are applied onto the substrate to be treated, for example, a vehicle body. The films may here be provided on one side with one or more coating layers and may have on the same or the other side an adhesive layer so that the film can be fixed onto the substrate. Such films and corresponding application processes have often been described in the literature, for example, in WO-A-00/08094, WO-A-00/63015, EP-A-251 546 and EP-A-361 351. In general, the film is laminated onto the substrate, where it remains. DE-A-196 54 918 describes a coating film usable for decorative purposes which comprises a "free coating film". The coating film comprises an adhesive layer and at least one coating layer. It is possible to dispense with a stabilizing backing film in this case.

SUMMARY OF THE INVENTION

The process according to the invention provides a process for repairing coated substrate surfaces by means of thermally curable coating compositions, which process is in particular suitable for repairing small blemished areas, for example, in the context of repair coating in vehicle original coating or in the context of vehicle repair coating in a paint shop, and permits the repair to be performed to the required quality quickly and straightforwardly without major preparation and clean-up effort.

The present invention relates to a process for repairing coated substrate surfaces comprising the following successive steps:

a) optionally, preparing a blemished area to be repaired,
b) providing at least one backing film coated on one side with an uncured or at least only partially cured coating layer of a thermally curable coating composition,
c) applying the at least one backing film with its coated side onto the blemished area to be repaired,
d) supplying thermal energy to the coating applied in this manner onto the blemished area to be repaired and
e) removing the at least one backing film, wherein the supply of thermal energy onto the coating proceeds through the at least one backing film, and/or after removal of the at least one backing film.

DETAILED DESCRIPTION OF THE EMBODIMENTS

It has surprisingly been found that, using the process according to the invention, it is possible quickly and straightforwardly to repair in particular small coating blemishes without any reduction in quality in comparison with conventional processes. Smooth, optically faultless surfaces having a good hardness are obtained which meet the conventional requirements placed upon a repair coating, in particular in vehicle coating, such as, resistance to solvents, water and weathering.

Steps d) and e) are preferably performed in such a manner that the supply of thermal energy proceeds through the backing film and the backing film is removed once the thermal energy has been supplied. Once the backing film has been removed, thermal energy optionally may be supplied again. It is also possible, but less preferred, to supply thermal energy to coating only after removal of the backing film.

The term "thermal energy" as used herein excludes the use of UV radiation and electron beam radiation.

The individual steps of the process according to the invention are explained in greater detail below.

In general, the blemished area to be repaired is prepared prior to the repair.

In this case, the process according to the invention begins with step a), namely preparation of the blemished area to be repaired. This involves preparing the damaged coating in accordance with the requirements of the repair. Normally, the coating is initially thoroughly cleaned, for example, with a silicone remover. The surface may then be slightly or lightly sanded with sanding paste or sandpaper and optionally, cleaned once again. If necessary, a viscous filler composition, for example, may be applied with a putty knife and appropriately post-treated. Alternatively, the blemished area may also be prepared by other means, for example, by laser treatment.

Step b) of the process according to the invention comprises the provision of a backing film coated on one side with an uncured or at least only partially cured coating layer of a thermally curable coating composition.

The backing film comprises films made from any desired, in particular, thermoplastic plastics which meet certain requirements with regard to heat resistance. In the case of the preferred embodiment of supplying thermal energy through the backing film, the films must be resistant to the temperatures which arise in the film material on supply of thermal energy. Suitable film materials are, for example, polyolefins, such as, polyethylene, polypropylene, polyurethane, polyamide and polyesters, such as, polyethylene terephthalate and polybutylene terephthalate. Films may also consist of polymer blends and optionally, may also be surface-treated. It is also possible for the films to have a textured surface, for example, a micro- and/or macrotextured surface. The thickness of the films may, for example, be between 10 and 1000 μm, preferably, between 10 and 500 μm, particularly preferably, between 20 and 250 μm and is determined by practical considerations of processability. The films selected should preferably be those which are resilient and extensible and cling effectively to the substrate by electrostatic forces.

The backing films are coated on one side with liquid or pasty coating compositions curable by means of thermal energy. The coating compositions may be aqueous, diluted with solvents or contain neither solvents nor water. The coating compositions curable by supply of thermal energy are the coatings known to the person skilled in the art that contain binders curable by means of ionic and/or free-radical polymerization, as well, as binders curable by means of polycondensation and/or polyaddition reactions. When selecting the binders, care must be taken to use only those thermally cross-linkable binders that are stable in storage prior to supply of thermal energy.

Ionically curable coating compositions that are to be applied onto the backing film in the process according to the invention contain one or more ionically polymerizable binders. These may comprise conventional binders known to the person skilled in the art, preferably, cationically polymerizable binders, such as, polyfunctional epoxy oligomers containing more than two epoxy groups per molecule. These comprise, for example, polyalkylene glycol diglycidyl ethers, hydrogenated bisphenol A glycidyl ethers, epoxyurethane resins, glycerol triglycidyl ether, diglycidyl hexahydrophthalate, diglycidyl esters of dimer acids, epoxidized derivatives of (methyl)cyclohexene, such as, 3,4-epoxycyclohexylmethyl (3,4-epoxycyclohexane)carboxylate or epoxidized polybutadiene. The number average molar mass of the polyepoxy compounds is preferably below 10,000. Reactive diluents, such as, cyclohexene oxide, butene oxide, butanediol diglycidyl ether or hexanediol diglycidyl ether, may also be used.

The cationically curable coating compositions contain one or more thermally activatable initiators. Initiators which may be used are, for example, thermolabile onium salts.

Free-radically curable coating compositions that are to be applied onto the backing film in the process according to the invention contain one or more binders with free-radically polymerizable olefinic double bonds. Suitable binders having free-radically polymerizable olefinic double bonds that may be considered are, for example, any binders known to the skilled person that can be cross-linked by free-radical polymerization. These binders are prepolymers, such as, polymers and oligomers containing, per molecule, one or more, preferably, on average 2 to 20, particularly preferably, 3–10 free-radically polymerizable olefinic double bonds. The polymerizable double bonds may, for example, be present in the form of (meth)acryloyl, vinyl, allyl, maleate and/or fumarate groups. The free-radically polymerizable double bonds are particularly preferably present in the form of (meth)acryloyl groups.

Both here and below, (meth)acryloyl or (meth)acrylic are intended to mean acryloyl and/or methacryloyl or acrylic and/or methacrylic. Examples of prepolymers or oligomers include (meth)acryloyl-functional poly(meth)acrylates, polyurethane (meth)acrylates, polyester (meth)acrylates, unsaturated polyesters, polyether (meth)acrylates, silicone (meth)acrylates, epoxy (meth)acrylates, amino (meth)acrylates and melamine (meth)acrylates. The number average molar mass Mn of these compounds may be, for example, 500 to 10,000 g/mol, preferably, 500 to 5000 g/mol. The binders may be used individually or as a mixture. (Meth)acryloyl-functional poly(meth)acrylates and/or polyurethane (meth)acrylates are preferably used.

The prepolymers may be used in combination with reactive diluents, i.e., free-radically polymerizable low molecular weight compounds with a molar mass of below 500 g/mol. The reactive diluents may be mono-, di- or polyunsaturated. Examples of monounsaturated reactive diluents are: (meth)acrylic acid and esters thereof, maleic acid and semi-esters thereof, vinyl acetate, vinyl ethers, substituted vinylureas, styrene, vinyltoluene. Examples of diunsaturated reactive diluents are: di(meth)acrylates, such as, alkylene glycol di(meth)acrylate, polyethylene glycol di(meth)acrylate, 1,3-butanediol di(meth)acrylate, vinyl (meth)acrylate, allyl (meth)acrylate, divinylbenzene, dipropylene glycol di(meth)acrylate, hexanediol di(meth)acrylate. Examples of polyunsaturated reactive diluents are: glycerol tri(meth)acrylate, trimethylolpropane tri(meth)acrylate, pentaerythritol tri(meth)acrylate, pentaerythritol tetra(meth)acrylate. The reactive diluents may be used alone or in mixture.

In order to initiate free-radical polymerization, the coating compositions may contain thermally activatable free-radical initiators which decompose at different temperatures, depending on the initiator type. Examples of such free-radical initiators include, organic peroxides, organic azo compounds or C—C-cleaving initiators, such as, dialkyl peroxides, peroxycarboxylic acids, peroxydicarbonates, peroxide esters, hydroperoxides, ketone peroxides, azodinitriles or benzopinacole silyl ethers. The free-radical initiators are preferably used in quantities of between 0.1 and 5 wt-%, relative to resin solids content. The thermal initiators may be used individually or in combination.

Thermally curable coating compositions that cure by means of polycondensation reactions and/or by means of polyaddition reactions and are to be applied onto the backing film in the process according to the invention contain one or more binders with appropriately cross-linkable functional groups. Suitable binders are those binders or binder systems that are stable in storage prior to supply of thermal energy. Single component binder systems are preferred.

The addition and/or condensation reactions as stated above comprise coatings chemistry cross-linking reactions known to the person skilled in the art, such as, ring-opening addition of an epoxy group onto a carboxyl group forming an ester and a hydroxyl group, the reaction of a hydroxyl group with a blocked isocyanate group forming a urethane group and eliminating the blocking agent, the reaction of a hydroxyl group with an N-methylol group eliminating water, the reaction of a hydroxyl group with an N-methylol ether group eliminating the etherification alcohol, the transesterification reaction of a hydroxyl group with an ester group eliminating the esterification alcohol, the transurethanization reaction of a hydroxyl group with a carbamate group eliminating alcohol, the reaction of a carbamate group with an N-methylol ether group eliminating the etherification alcohol.

Moisture-curing binder components are also possible, for example, compounds with free isocyanate groups, with hydrolyzable alkoxysilane groups or with ketimine- or aldimine-blocked amino groups. In the event that the coating compositions contain binders or functional groups that cure by means of atmospheric humidity, certain conditions must be maintained during preparation of the coating backing films in order to avoid premature curing. This issue is addressed in greater detail below in the description of the form of the coated backing film.

The various cross-linking mechanisms described above may be combined at will, provided that they do not mutually interfere. The various cross-linkable functional groups may here be present in the same binder and/or in separate binders. Binders that cross-link without elimination are preferably used in the process according to the invention. In particular, free-radically polymerizable binder systems are used in combination with thermal initiators. These binder systems may optionally be combined with at least one of the above-stated binder systems which cross-link by means of a polycondensation and/or polyaddition reaction.

The coating compositions that may be used in the process according to the invention for coating the backing film may be pigmented or unpigmented coating compositions. Unpigmented coating compositions are, for example, coating compositions formulated in conventional manner as clear coats. Pigmented coating compositions contain color-imparting and/or special effect-imparting pigments. Suitable color-imparting pigments are any conventional coating pigments of an organic or inorganic nature. Examples of inorganic or organic color-imparting pigments are titanium dioxide, micronized titanium dioxide, iron oxide pigments, carbon black, azo pigments, phthalocyanine pigments, quinacridone or pyrrolopyrrole pigments. Examples of special effect-imparting pigments are metal pigments, for example, made from aluminium or copper; interference pigments, such as, metal oxide coated metal pigments and titanium dioxide coated mica.

The coating compositions may also contain transparent pigments, soluble dyes and/or extenders. Examples of usable extenders are silicon dioxide, aluminium silicate, barium sulfate, calcium carbonate and talcum.

The coating compositions may also contain conventional coating additives. Examples of conventional coating additives include levelling agents, rheological agents, such as, highly disperse silica or polymeric urea compounds, thickeners, for example, based on partially cross-linked, carboxy-functional polymers or on polyurethanes, defoamers, wetting agents, anticratering agents, catalysts, antioxidants and light stabilizers based on HALS products and/or UV absorbers. Preferably, usable light stabilizers are sterically hindered morpholin-2-one derivatives, in particular, morpholin-2-one derivatives sterically hindered by 3,3,5,5 polysubstitution.

The additives are used in conventional amounts known to the person skilled in the art.

The coating compositions may contain water and/or organic solvents. The latter comprise conventional organic coating solvents known to the person skilled in the art.

The coating compositions curable by means of thermal energy may be applied onto the backing film by conventional methods, for example, by brushing, roller coating, pouring, knife coating or spraying. The coating composition may be applied as a melt or in the liquid phase, for example, as a solution. The coating compositions may, for example, be knife coated as a solution. In the subsequent drying process, the solvent is allowed to evaporate, optionally, with gentle heating. The coating must in no event be completely cross-linked during the drying process. The dried, non-cross-linked coating should advantageously be slightly tacky at room temperature in order to ensure good adhesion onto the substrate to be repaired. The coating may either be intrinsically tacky due to specially formulated binders or tackiness may be achieved by slight partial cross-linking/gelling of the dried coating, for example, by gentle heating. The coating compositions curable by means of thermal energy are generally applied in layer thicknesses of 1 to 100 $\mu$m, preferably of 5 to 60 $\mu$m.

It is in principle possible, although not preferred, for the backing film to be provided with more than one coating layer, for example, with a pigment base coat and a transparent clear coat. In the latter case, the clear coat would first be applied onto the backing film and then the base coat would be applied onto the clear coat, for example, wet-on-wet and optionally, after a flash-off phase.

One possible embodiment of the coated backing film consists in applying the coating with a layer thickness that reduces towards the edges of the film so that, when it is subsequently applied, edge marks in the existing coating are avoided.

In order to facilitate subsequent removal of the backing film from the substrate to be repaired, it may be advantageous to leave at least one edge zone of the backing film uncoated. It may also be advantageous to provide a special finish on the side of the backing film that is to be coated, for example, a release coating, or to use special surface-treated films with non-stick properties, in order, on removal of the backing film, to facilitate detachment from the coating that is fixed to the substrate to be repaired.

It may also be advantageous to provide the coated backing film with a temporary protective film to provide protection. The protective film may here be present only on the coated side of the backing film, but it may also be applied onto both sides and completely enclose the entire coated backing film. The latter possibility would in particular be advisable in the event of presence of the above-described moisture-curing binders or functional groups in order to exclude atmospheric humidity. In order to protect the coating on the backing film from premature polymerization brought about, for example, by exposure to light, a colored, for example, black film material may advantageously be used. A black polyethylene film may, for example, be used. In order to facilitate detachment of the protective film, it too may also, as described above, be provided with non-stick properties.

The coated films, optionally, provided with protective film or protective envelope, may be prefabricated and stored in the most varied shapes and sizes, for example, in sizes of 0.5 $cm^2$ to 400 $cm^2$, preferably of 1 $cm^2$ to 100 $cm^2$. The films may also be stored as a reel of continuous film.

After provision of at least one coated backing film and removal of an optionally present protective film or protective envelope, the at least one backing film is applied with its coated side onto the blemished area to be repaired in accordance with step c) of the process according to the invention. Favourably, a film sheet size is selected that perfectly fits over the blemished area, taking account of any uncoated edge zones or layer thicknesses that reduce towards the edges. As already mentioned, the blemished area may be lightly sanded or roughened before application of the coated backing film in order to ensure good adhesion. The film is then laminated onto the substrate, preferably with exposure to pressure and, optionally, heat, so fixing the coating onto the substrate to be coated. This may, for example, be carried out with a heatable roller, for example, a rubber roller. Coating layers comprising a blemished area to be repaired that may be considered are, for example, electrodip coated substrates, surfacer, primer, filler and base coat layers, but in particular, clear coat and single layer top coat layers. The coated backing film may here be applied either onto the damaged coating layer or onto an underlying coating layer. The latter case arises, for example, if the blemished area is sanded down to one of the underlying coating layers, for example during preparation for the repair.

After application of the coated backing film with its coated side onto the blemished area to be repaired, the coating applied in this manner is supplied with thermal energy (process step d). Thermal energy may here be supplied through the backing film and/or the coating is directly exposed to thermal energy after removal of the backing film. When using systems comprising binders cross-linkable by means of condensation reactions, thermal energy is advantageously supplied only once the backing film has been removed as the elimination products arising during the cross-linking reaction may otherwise be disruptive.

Thermal energy may be supplied to the coating in various ways. Supply of thermal energy according to process step d) may proceed using a single method or a combination of two or more conventional methods, for example, by radiant heating by means of infrared and/or near infrared irradiation and/or by convection, for example, by means of hot air and/or by induction heating (in the case of metallic substrates) and/or by contact heating, for example, using a heatable heat-transfer means, such as, a heatable roller or plate which is applied or laid directly on the coated film. Preferred methods are infrared irradiation, near infrared irradiation and supply by contact heating. Thermal energy may be supplied in known manner, for example, in an oven or in a conveyor unit. Thermal energy is preferably supplied only locally onto the blemished area to be repaired, for example using appropriately arranged infrared radiation emitters or near infrared radiation emitters, using a hot air blower or by contact heating.

Conventional infrared radiation emitters and near infrared radiation emitters may be considered as radiation sources for the preferred infrared irradiation and near infrared irradiation. The infrared radiation emitters preferably comprise infrared radiation emitters that emit radiation in the short wavelength infrared range, for example, between 0.8 and 2 $\mu$m, or infrared radiation emitters that emit radiation in the medium wavelength infrared range, for example, between 2 and 4 $\mu$m. The infrared radiation emitter or emitters may be positioned in front of the substrate surface to be irradiated, for example, at a distance of 20 to 70 cm. The irradiation time with infrared radiation may amount, for example, to 1 to 30 minutes.

The near infrared radiation emitters to be used comprise such radiation emitters which emit short wavelength infrared radiation of the wavelength range from approx. 760 to approx. 1500 nm; preferably, 760 to 1200 nm. Such NIR radiation emitters are commercially available from Adphos. They are, for example, high-performance halogen radiation emitters with an intensity (radiation output per unit area) of generally greater than 10 $kW/m^2$ to, for example, 15 $MW/m^2$, preferably, between 100 $kW/m^2$ and 800 $kW/m^2$. For example, the radiation emitters reach a radiation emitter surface temperature (coil filament temperature) of more than 2000 K, preferably, more than 2900 K, for example, a temperature from 2000 to 3500 K. Suitable radiation emitters have, for example, an emission spectrum with a maximum between 750 and 1200 nm.

The distance between the object and NIR radiation emitter may be, for example, 2 to 60 cm, the irradiation time may be, for example, from 1 to 300 s. The irradiation time refers either to the duration of continuous irradiation or to the sum of the periods of different irradiation cycles. By selecting the various parameters in a controlled manner, different surface temperatures may be obtained, for example, surface temperatures from 80 to 250° C. The surface temperatures also may, however, be over 250° C.

An appropriately heat-resistant film material must be selected depending upon the curing temperatures required for the thermal curing. The temperature sensitivity of the substrate to be repaired must also be taken into consideration when selecting the curing temperature.

In the preferred case of supplying thermal energy through the backing film, the film is removed after the energy has been supplied. To this end, the coating is advantageously first allowed to cool before the film is removed. When removing the backing film, it is favourable if the film is uncoated on at least one edge zone so as to facilitate detachment of the film.

One embodiment of the invention consists in effecting a partial cure of the coating by initially supplying thermal energy through the film and, once the film has been removed, effecting final curing in a second energy supply step. In other words, the dose of thermal energy required for complete cure is supplied in at least two separate steps.

After removal of the backing film and optional subsequent final thermal curing and preferably, a cooling phase, the repaired area may be polished.

It is, in principle, also possible to apply more than one coated backing film onto the blemished area to be repaired. This may be performed by, for example, applying two or more backing films adjacent to each other and/or by applying at least one further backing film onto a coating which has been applied by means of a first backing film and optionally has been cured. Depending upon requirements, this may, for example, in the latter case comprise a first backing film coated with a base coat and a second coated with a clear coat or a first backing film coated with a filler and a second coated with a single layer top coat.

If a backing film provided with a textured surface is coated and applied according to the invention, repair-coated surfaces provided with the corresponding negative textures are obtained after removal of the backing film. This may, for example, prove necessary when repairing substrate surfaces which are themselves textured.

Substrates that are suitable for the process according to the invention are any desired substrates, for example, of metal or plastic, or composite substrates made from metal and plastic components.

The process according to the invention may find application for repairing any desired coated substrates, for example, in industrial and vehicle coating, for example, in repair coating of vehicle bodies in vehicle original coating (end-of-line repair) or in a repair workshop. The process according to the invention may particularly advantageously be used for repairing small blemished areas (spot repairs). In particular, clear coats or pigmented single layer top coats may be applied onto an existing multi-layer coating for repair purposes by the process according to the invention.

The following Example is intended to illustrate the invention in greater detail.

EXAMPLE pbw=parts by weight
wt-%=weight-%

A metal test sheet coated with an electrodip primer, filler, base coat and clear coat having two blemished areas of approx. 10 $cm^2$, only the clear coat being damaged, was repaired. The blemished areas were first cleaned and lightly sanded.

Production of a Coated Backing Film

A polyurethane thermally curable by means of free-radical polymerization was first produced as follows:

369.4 parts by weight (pbw) of isophorone diisocyanate were combined with 0.6 pbw of methylhydroquinone and 80 pbw of butyl acetate in a 2 l four-necked flask with a stirrer, thermometer, dropping funnel and reflux condenser and heated to 80° C. A mixture of 193 pbw of hydroxyethyl acrylate and 0.5 pbw of dibutyltin dilaurate was added dropwise in such a manner that the reaction temperature did not rise above 100° C. 50 pbw of butyl acetate were used to rinse out the dropping funnel. The temperature was maintained at a maximum of 100° C. until an NCO-value of 10.1 was obtained. 300 pbw of a polycaprolactone triol (Capa 305 from Interox Chemicals) and 50 pbw of butyl acetate were then added. The reaction mixture was maintained at a maximum of 100° C. until an NCO-value of <0.5 was obtained. The mixture was then diluted with 69.6 pbw of butyl acetate. A colourless, highly viscous resin with a solids content of 75 wt-% (1 h/150° C.) and a viscosity of 10,000 mPas was obtained.

A thermally curable clear coat was then produced from the following constituents:

80.8 wt-% of the polyurethane produced above 1.3 wt-% of a commercially available thermolabile peroxide free-radical initiator (Trigonox® 21 from Akzo), 0.1 wt-% of a conventional commercial levelling agent (Ebecryl 350/UCB)

0.8 wt-% of a conventional commercial UV absorbent (Tinuvin® 384/CIBA)

0.8 wt-% of a conventional commercial light stabiliser (HALS based) (Tinuvin® 292/CIBA)

16.2 wt-% of butyl acetate.

The resultant clear coat was then applied onto a backing film. To this end, the clear coat was blade coated to a dry film thickness of approx. 40 μm onto one side of a 20 μm thick polyester film. The applied clear coat layer was dried for 10 minutes at 60° C. to evaporate the solvent. A slightly tacky, no longer flowable surface is obtained.

Application of the Coated Backing Film and Curing of the Coating

A piece of the film as coated above of a size suitable for the particular blemished area was laid with its coated side on the particular blemished area. The coating film was then heated through the film with an IR radiation emitter to approx. 80° C. and laminated without bubbles onto the blemished area under gentle pressure.

a) 1st Blemished Area:

The still warm and liquid coating material was then irradiated through the film for 6 seconds and cured by means of a conventional commercial near infrared radiation emitter (400 $kW/m^2$, 100% power, High-burn-emitter of Adphos) at a distance of 20 cm. The backing film was then removed. The edges of the blemished area repaired in this manner were finally blended in by polishing.

b) 2nd Blemished Area:

The still warm and liquid coating material was then irradiated through the film for 20 minutes and cured by means of a conventional commercial infrared radiation emitter (emission spectrum maximum: 2.4 μm; 20 $kW/m^2$; Heraeus) at a distance of 40 cm. The backing film was then removed. The edges of the blemished area repaired in this manner were finally blended in by polishing.

The surface quality, hardness, gloss and solvent resistance achieved were comparable with those achieved with conventional thermally curable coatings. The repaired blemished area could be polished immediately after curing and left no edge marks in the existing coating.

What is claimed is:

1. A process for repairing a coated automotive substrate surface comprising the following successive steps:

a) providing a blemished area to be repaired;

b) optionally, preparing the blemished area to be repaired;

c) providing a composite structure consisting of at least one backing film coated on one side with an uncured or only partially cured coating layer of a thermally curable coating composition;

d) applying the composite structure with its coated side onto the blemished area to be repaired, e) supplying thermal energy to the coating applied in this manner onto the blemished area to be repaired by at least one conventional infrared radiation emitter or a near infrared radiation emitter positioned away from the at least one backing film; and f) removing the at least one backing film;

wherein the supply of thermal energy onto the coating proceeds through the at least one backing film to the coating layer of the thermally curable coating composition of step c) and whereby the blemished area of the coated automotive substrate is repaired.

2. The process according to claim 1, wherein the uncured or at least only partially cured coating layer of step c) comprises a coating layer with a tacky surface.

3. The process according to claim 1, wherein the thermally curable coating composition comprises a coating composition with free-radically polymerizable binders.

4. The process according to claim 1, wherein the thermally curable coating composition comprises a coating composition with binders cross-linkable by means of polycondensation and/or polyaddition reactions.

5. The process according to claim 1, wherein a backing film with a protective film on one or both sides is provided in step c).

6. The process according to claim 1, wherein application of the composite structure in step d) proceeds under pressure.

7. The process according to claim 1, wherein supply of thermal energy to the blemished area to be repaired is positioned 20 to 70 cm from the backing film.

8. The process according to claim 7, wherein the supply of thermal energy to the blemished area to be repaired is performed with near infrared radiation emitters which emit near infrared radiation of a wavelength range of 760 to 1200 nm and an intensity (radiation output per unit area) of 100 $kW/m^2$ to 15 $MW/m^2$.

* * * * *